(No Model.)
G. B. ESSEX.
LUBRICATOR.
No. 493,824. Patented Mar. 21, 1893.
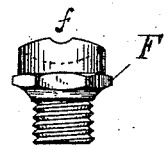
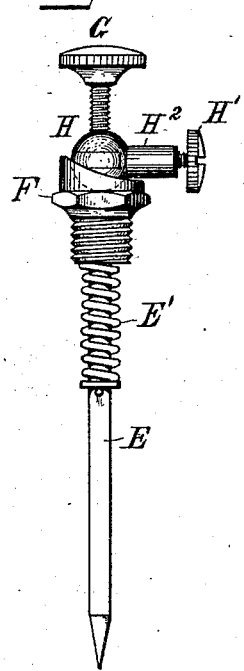
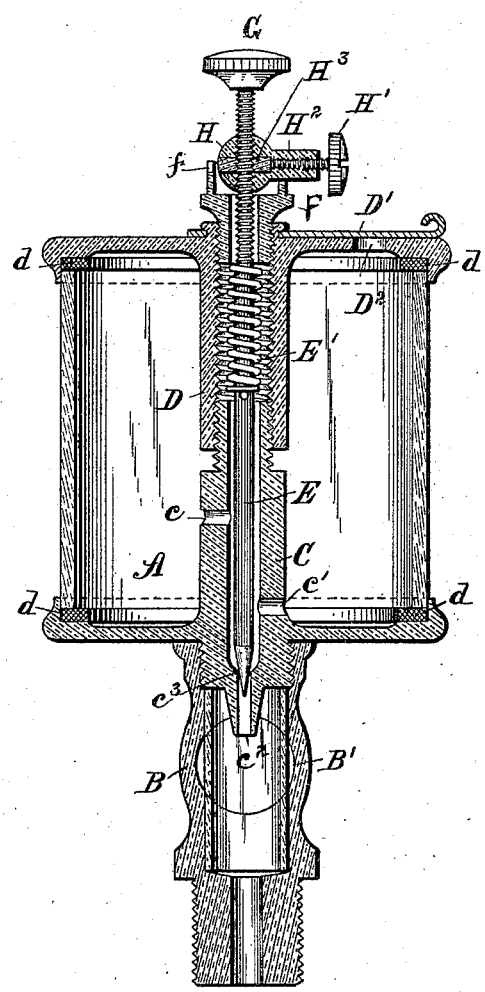
WITNESSES
H. E. Whitaker
W. A. Lowry
George B Essex
INVENTOR
by
R V Mason
his Attorney.

UNITED STATES PATENT OFFICE.

GEORGE B. ESSEX, OF DETROIT, MICHIGAN, ASSIGNOR TO THE MICHIGAN LUBRICATOR COMPANY, OF SAME PLACE.

LUBRICATOR.

SPECIFICATION forming part of Letters Patent No. 493,824, dated March 21, 1893.

Application filed October 31, 1892. Serial No. 450,572. (No model.)

*To all whom it may concern:*

Be it known that I, GEORGE B. ESSEX, of Detroit, county of Wayne, and State of Michigan, have invented a new and useful Improvement in Oilers, of which the following is a specification.

In the annexed drawings making part of this specification, Figure 1— is a vertical central section of the oiler. Fig. 2— is an elevation of the plug which carries the adjusting pin. Fig. 3— is an elevation of the plug and adjusting pin.

The oiler is of the common form in which a glass cylinder, A, is confined between two metallic heads coupled by centrally threaded stems D and C, and made oil tight by means of packing rings $d$ at the top and bottom of the glass cylinder.

B, is a stem to which the cylinder is screwed, and which itself screws into the part to be lubricated. It is provided with a sight glass B′, by means of which the formation of the drop can be seen.

The stem C is hollow. The oil entering it at $c'$ escapes through the orifice $c^2$, the amount of feed being determined by the pin E, which passes down through the plug F descending through the hollow stem C, terminating in a point in the seat $c^3$. It may be turned up or down by means of the thumb nut G on its upper end, or it may be raised by hand when free feed is desired temporarily. The pin is held down upon its seat by the tension of the spiral spring E′.

$D^2$ is the feed hole through which the oil is poured and is closed by a swinging cover D′.

My invention relates to mechanism provided for giving adjustment to the pin, and at the same time providing a means by which the feed may be thrown off and on without disturbing the set adjustment. This is accomplished by means of the nut H, shaped as clearly shown in Figs. 1 and 3. The nut has an internal thread engaging an external thread upon the pin E, by means of which the pin may be raised or lowered to give it greater or less feed. A slot or recess is cut in the equatorial diameter of the globular nut H, as shown at $H^3$, into which slot or recess is inserted an adjustable disk $H^3$, having a hole in the center internally threaded to receive the thread of the pin. A lateral tubular arm $H^2$ is also internally threaded to receive a set screw H′, by means of which the pin E (after it has been properly adjusted) is rigidly confined against longitudinal movement by screwing the point of the set screw down against the disk $H^3$ pressing the external thread of the pin against the internal thread of the disk. This lateral tubular arm $H^2$ rests upon the inclined surface of a bevel edged collar $f$ on the screw plug F. This collar is beveled in both directions, and at its highest point has a depression, as clearly shown in Fig. 2. The point of the set screw H′ may press directly against the face of the pin G, but as this tends to injure the thread thereon, I prefer to use an interposed solid piece to receive the point of the screw and distribute the pressure over a broader surface.

The operation of this oiler is very simple. When the cylinder has been filled with oil, the arm $H^2$ is brought into the notch in the collar $f$, and the pin E is adjusted to give the required feed, and when that is done it is secured by drawing down the set screw H′ firmly against the collar which surrounds the pin. When the machine is stopped, or it is desired for any reason to suspend the feed, it may be done by simply pushing the arm $H^2$ to one side so as to escape from the notch in the collar, when the expansion of the spring E′ will force the point of the pin E against the seat $c^3$, cutting off the supply of oil without disturbing the set arrangement. When the feed is to be thrown on again, the arm $H^2$ is pushed to one side into it drops into the notch in the collar $f$, when the feed is re-established precisely as it was adjusted by the operator.

I am aware that oilers have been made with a pin and valve seat, and a collar on the cap, with a beveled edge, for holding the valve open, and closing it without disturbing the set adjustment.

My invention is distinguished from others in the use of a nut, normally resting on the plug or collar part thereof, through which the pin moves in adjusting the feed, but which goes with the pin when the latter is moved to open and close the feed valve without altering the set adjustment.

What I claim as my invention, and desire to secure by Letters Patent, is—

1. In an oiler, the combination with the cylinder, of an adjustable pin E, a plug F fixed on the cap of the oil cup, constructed with a beveled collar $f$, and a hole for the free passage of the pin, a threaded nut H on the threaded portion of the pin, normally supported by the plug, and means for adjustably confining said nut on the pin, whereby the pin moves through the nut in adjusting the feed, but is carried with it when the pin is moved for other purposes, substantially as set forth.

2. In combination with the cylinder A, pin E and seat $e^3$ of an oiler, the plug F constructed with a beveled-edged collar $f$, a nut H, arm $H^2$ supported on the collar, set screw H', and disk $H^3$ interposed between the point of the set screw and threaded portion of the pin, substantially as set forth.

In testimony whereof I have hereunto subscribed my name in the presence of two attesting witnesses.

GEORGE B. ESSEX.

Witnesses:
R. MASON,
JESSE M. SMITH.